R. A. Goodyear,
Snap Hook,
N° 35,931.      Patented July 22, 1862.

Witnesses,
Manton Marble
Wm H. Harrison

Inventor:
Robert A. Goodyear
by A Pollok, atty.

UNITED STATES PATENT OFFICE.

ROBERT A. GOODYEAR, OF NEW YORK, N. Y.

IMPROVEMENT IN SNAP-HOOKS.

Specification forming part of Letters Patent No. 35,931, dated July 22, 1862.

*To all whom it may concern:*

Be it known that I, ROBERT A. GOODYEAR, of the city of New York, in the county of New York and State of New York, have invented a new and useful Improvement in Snap-Hooks; and I hereby declare the following to be a full, clear, and exact description of the same, reference being had to the accompanying drawings, in which—

Figure 3:
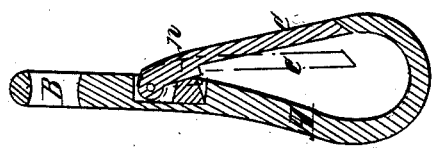
Figure 2:
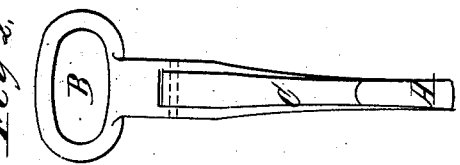
Figure 1:
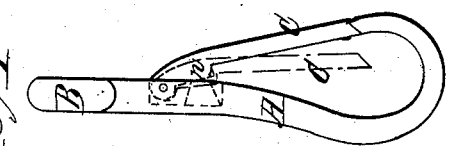

Figure 1 is a side elevation, Fig. 2 a front elevation, and Fig. 3 a sectional view, of my improved snap-hook.

My invention consists, first, in so locating the spring operating the snap within the body of the hook or of the snap, or of both, as that the loop of the hook shall be free from any spring; second, in the combination, with a cavity in the body of the hook for the location therein of the snap-operating spring, of a shoulder or enlargement upon the snap, so shaped that the spring shall thereby be protected against all injury and securely held within the said cavity; third, in forming the snap-operating spring of vulcanized india-rubber, or its equivalent, and in so arranging it at or near the hinge of the snap that the spring shall act by virtue of its elasticity to compression.

Snap-hooks as heretofore constructed consisted of a looped hook made in two parts, consisting of the hook proper and of a bar hinged to the shank of the hook. The bar is actuated by means of a metallic spring to close against the curved branch of the hook, thereby intended to prevent any strap, ring, or other fastening device from becoming disengaged therefrom unless purposely released by depressing the bar or "snap," as it is termed. The metallic spring operating the snap is ordinarily placed within the loop formed by the hook and bar, and is fastened either to the shank of the hook when its other end would bear on the closing-bar, or is secured to the closing-bar itself when its other extremity would bear on the shank. Sometimes the closing-bar is entirely dispensed with, and in lieu thereof a spring fast to the shank of the hook is used, which by its outward tendency closes the otherwise open loop of the hook. Such snap-hooks have been found seriously defective for reasons well known to those familiar with the use of the device, of which I would mention the inconvenience arising from the location of the spring within the loop of the hook. The spring when so arranged often catches with or is twisted off by the strap or other fastening device used in connection with it. Thus hitching-straps of horses are often disengaged by some movement of the horse whereby the spring is depressed. Another objection to the ordinary metallic-spring snap-hook consists in the liability of the spring (without which it would be inoperative) to rust or corrode, and thus become brittle; also, in being exposed to blows and other injuries, whereby it is often broken or bent beyond its degree of elasticity. Moreover, in the manufacture of the old snap-hook it has been found very inconvenient, difficult, and expensive to fix the spring to the hook, which necessitated the boring of holes through both the hook and spring and the riveting of the two together. These and other objections are obviated by my improvement, a detailed description of which I shall now proceed to give by referring to the accompanying drawings, in which—

A in the several figures represents the hook proper. It may be constructed of steel or other suitable material in the usual manner, having a shank surmounted at its upper end by a transverse loop, B, for the reception of the strap, belt, or other similar contrivance to which it is attached, and its lower extremity being bent upward, so as to give it the form of a hook, upon which the object to be carried by the hook is suspended or hooked. The shank of the hook A is provided at its inner side and near the loop B with a cavity or recess preferably of oblong and rectangular form. This recess is designed to form the hinge-socket to the snap-bar C, and to contain the spring which is to operate the snap. The latter is of the sectional dimension and rounded like the curved end of the hook, and is otherwise of such form as that when adjusted and closed it forms but the continuation of the hook, and, having at its closing end a bevel-face snugly fitting a similar bevel-face of the hook, both hook and snap will have the appearance of being made in one piece.

The upper or hinge end of the snap-bar is of quadrangular or other sectional form to fit the cavity in the hook-shank, and is perforated in its center, or thereabout, a pin being inserted to pass through it and the sides of the recessed part of the shank to constitute a hinge.

The pin thus inserted is riveted down at its extremities to prevent its falling out. The upper or hinge end of the snap-bar is provided with a shoulder, *n*, projecting from the inner surface of the snap to an extent equal to the depth of the cavity. This arrangement, while allowing the snap a play within the interior of the hook-shoulder, will at times—*i. e.*, whether it be open or closed—fill the recess sufficiently to prevent the spring located within the cavity from being displaced or falling out and keep the hinge free from dirt or other substances calculated to clog and impair the action of the hinge. Before adjusting the snap to the hook I place into the cavity a spring of vulcanized india-rubber of the shape of a wedge, or of such other form as will fill the said cavity without being compressed while the snap is being closed against the hook, but which will be compressed by the shoulder of the snap when the latter is opened or moved upon its hinge toward the shank of the hook.

It will be readily understood that this my invention is susceptible of many modifications. I therefore do not wish to be understood as confining myself to the precise construction hereinbefore described, although I have described the best. Thus, instead of a spring of india-rubber, a little spiral or other form of spring of steel or other springy substance may be used. Again, instead of a cavity in the shank and a projecting shoulder on the snap, a cavity may be wrought into the snap and a corresponding shoulder may be used on the hook-shank.

Having thus described my invention, I claim—

As an article of manufacture, the snap-hook constructed, substantially as herein described, by providing the same, in lieu of the ordinary metallic spring, with a spring made of vulcanized india-rubber, and locating the same within the body of the hook or of the snap, or of both, in combination with a shoulder upon the hook or snap to prevent the rubber spring from falling out or being displaced.

In testimony whereof I have signed my name to this specification before two subscribing witnesses.

R. A. GOODYEAR.

Witnesses:
 ASA BIRD GARDNER,
 ARTHUR G. BOGART.